(12) United States Patent
Thornton

(10) Patent No.: US 7,011,254 B2
(45) Date of Patent: Mar. 14, 2006

(54) LAWN CHEMICAL APPLICATION SYSTEM

(76) Inventor: Brian Thornton, P.O. Box 17785, Little Rock, AR (US) 72222

( * ) Notice: Subject to any disclaimer, the term of this patent is extended or adjusted under 35 U.S.C. 154(b) by 0 days.

(21) Appl. No.: 10/916,226

(22) Filed: Aug. 10, 2004

(65) Prior Publication Data

US 2005/0098649 A1    May 12, 2005

Related U.S. Application Data

(62) Division of application No. 09/761,940, filed on Jan. 17, 2001, now abandoned.

(51) Int. Cl.
*A62C 5/02*    (2006.01)

(52) U.S. Cl. .................... 239/10; 239/69; 239/201; 239/203; 239/310; 239/317; 239/565

(58) Field of Classification Search ................ 239/10, 239/67, 69, 201, 203, 207, 310, 315, 316, 239/317, 318, 550, 565, DIG. 15; 137/268; 222/325, 630, 636, 637
See application file for complete search history.

(56) References Cited

U.S. PATENT DOCUMENTS

| | | | | |
|---|---|---|---|---|
| 1,216,051 A | * | 2/1917 | Bayley | ........................ 422/277 |
| 3,351,290 A | * | 11/1967 | Baldwin | ..................... 239/317 |
| 4,895,303 A | * | 1/1990 | Freyvogel | ................... 239/310 |
| 5,193,744 A | * | 3/1993 | Goldstein | ..................... 239/69 |
| 5,730,364 A | * | 3/1998 | Gertie | ......................... 239/201 |

* cited by examiner

*Primary Examiner*—Steven J. Ganey
(74) *Attorney, Agent, or Firm*—Speed Law Firm; Gary N. Speed; Kyla D. Cummings

(57) ABSTRACT

A lawn chemical application system is disclosed. The system comprises a dispenser having a lower chamber, an upper chamber, an upstream opening, and a downstream opening. The dispenser may be formed by a tee connector and a cylinder secured to an upper opening of the tee connector. Powered valves are operably connected to the upstream and downstream openings of the dispenser. The powered valves may be wired to open and close simultaneously. A lower portion of the upper chamber may be disposed below an upper portion of the lower chamber and above a lower portion of the lower chamber, leaving the lower portion of the lower chamber unobstructed over substantially its entire length. The lower portion of the upper chamber may have a plurality of openings to provide for adequate mixing of water with the chemicals stored in the upper chamber. In operation, soluble matter or other chemicals are placed in the upper chamber of the dispenser, and the two valves are opened simultaneously. Water flows through the first powered valve and into the dispenser, where the water is mixed with soluble matter or other chemicals stored in the upper chamber of the tee. The solution or mixture then passes from the dispenser, through the second powered valve, to one or more sprinkler heads of the irrigation system. When the application is finished, the valves are closed simultaneously.

17 Claims, 4 Drawing Sheets

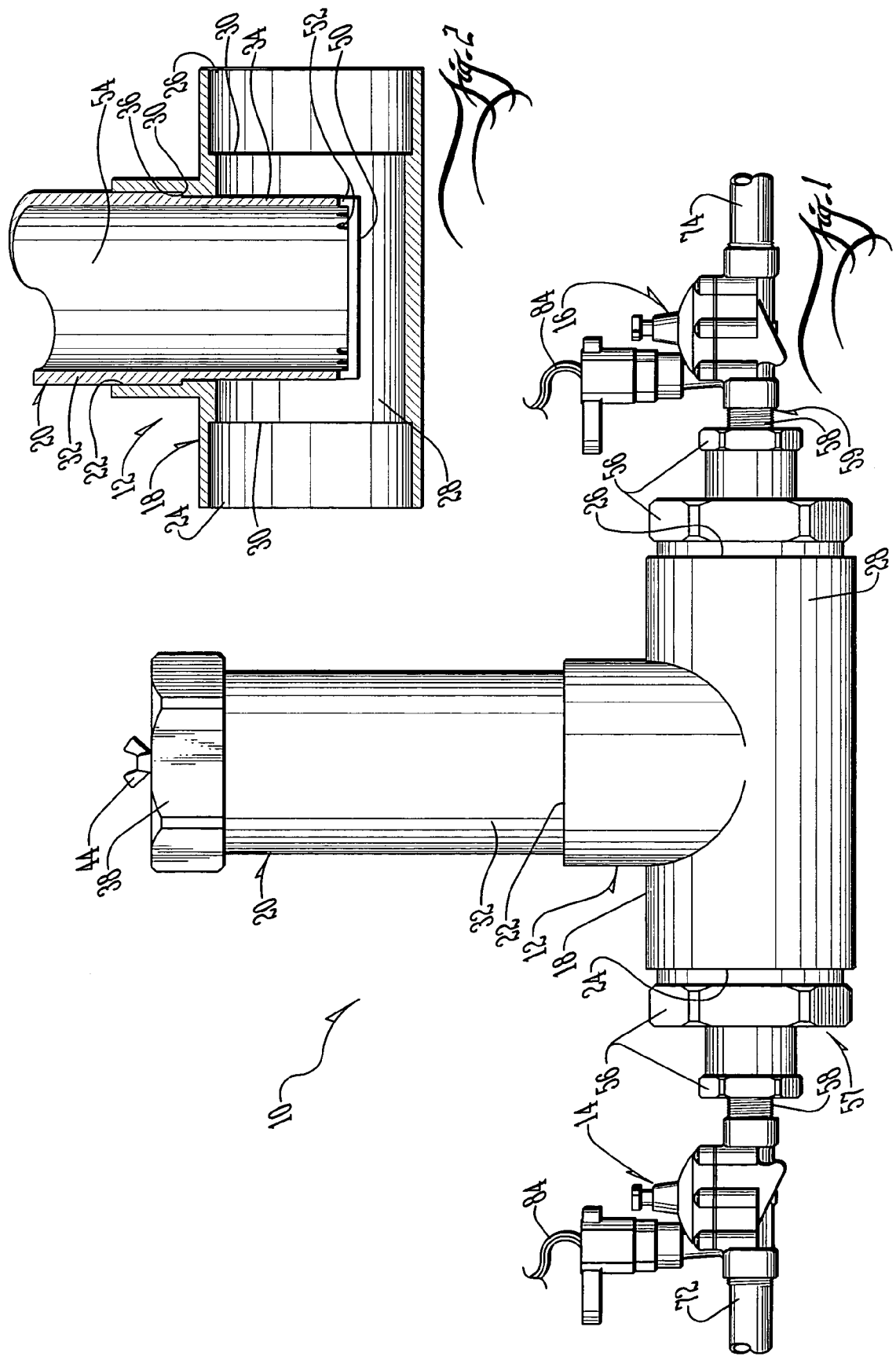

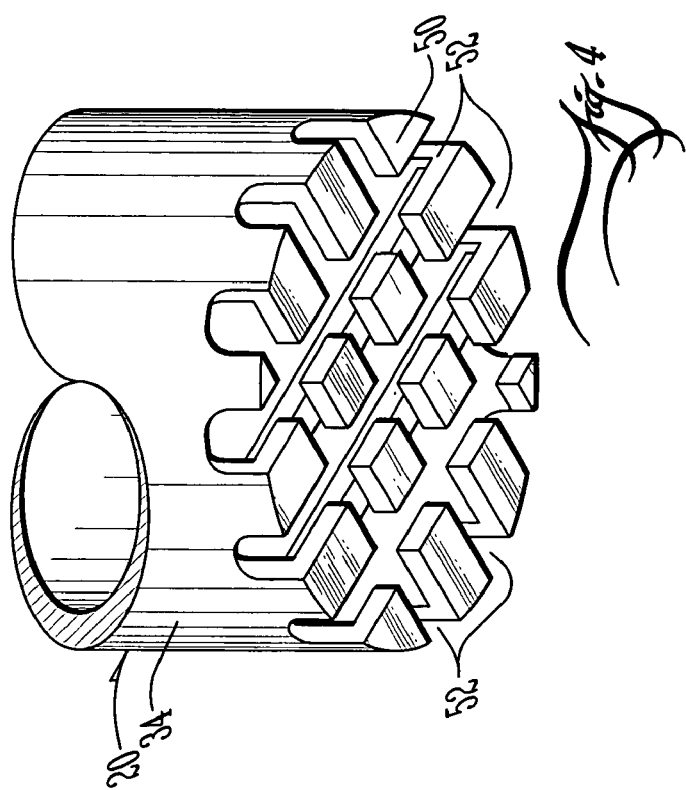
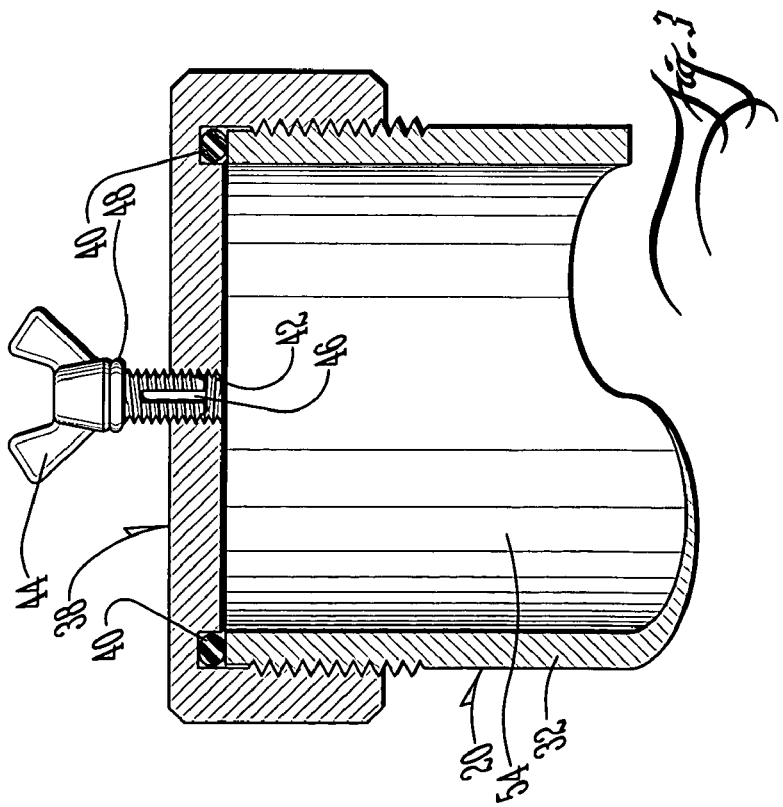

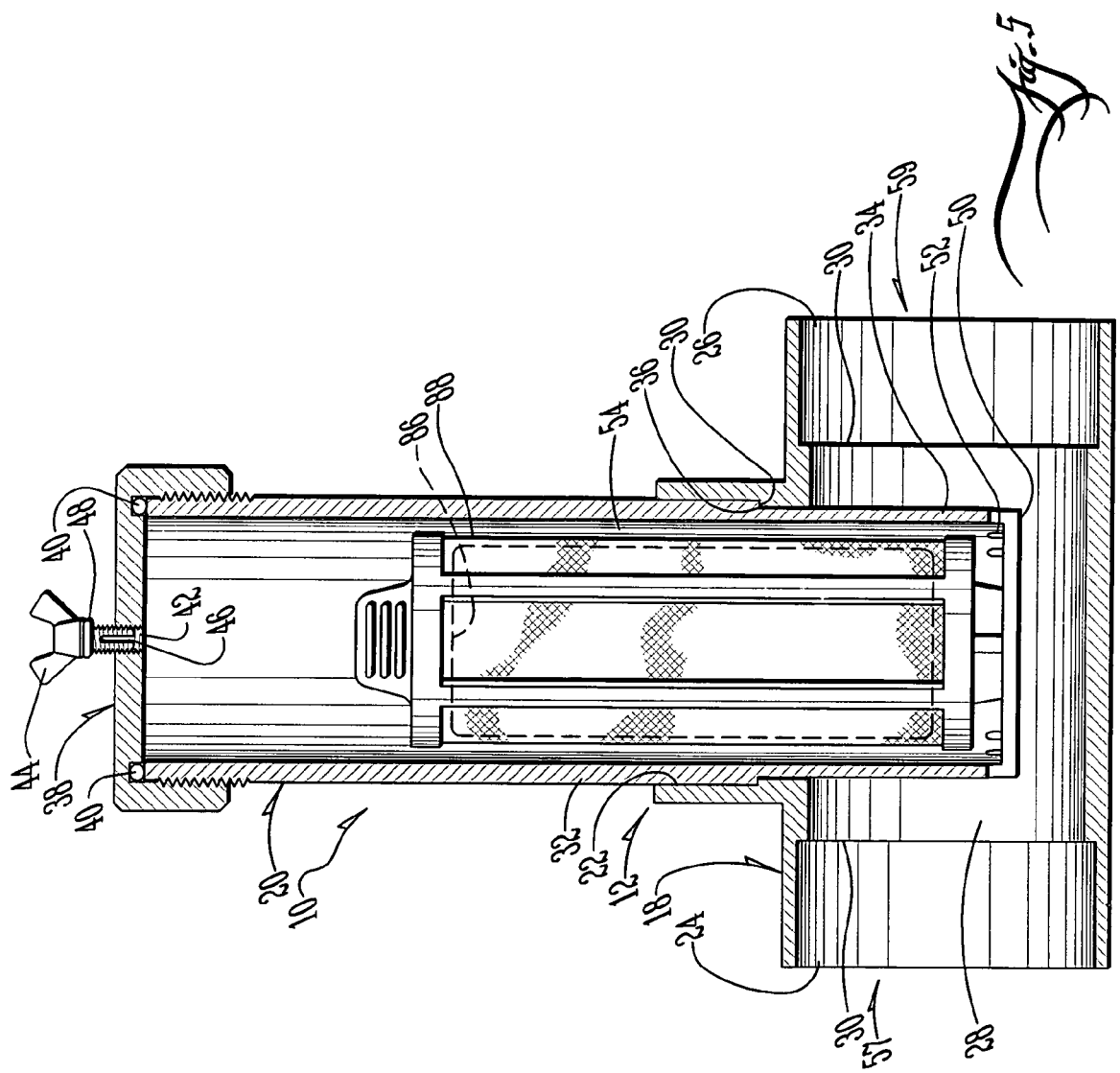

LAWN CHEMICAL APPLICATION SYSTEM

This application claims priority as a divisional of U.S. patent application Ser. No. 09/761,940, filed on Jan. 17, 2001 now abandoned.

BACKGROUND OF THE INVENTION

This invention relates to irrigation systems, and more particularly, to a lawn chemical application system integrated with an irrigation system.

It is generally known in the art to integrate a chemical dispenser with an irrigation system. This allows the irrigation system to apply chemicals such as fertilizer to a lawn or other area. Using an irrigation system to apply such chemicals offers many advantages over manual application. For example, it can save a tremendous amount of time and labor and can provide for a more even application of the chemicals.

Although they offer many advantages, known lawn chemical dispensing systems still suffer from a number of disadvantages. For example, such systems have often been complex and have often been difficult and costly to assemble and install. They have typically been difficult to use and have often required service calls from specially trained technicians. Known systems have often obstructed the flow of water too much, have often provided insufficient mixing of the chemicals with the water, and have often lacked flexibility in the types and forms of chemicals that may be used in the systems. Known systems have also failed to provide protection against undesired seepage of chemicals from the dispenser into the irrigation system when the irrigation system was not in use. Such seepage can lead to high concentrations of chemicals in isolated areas of a system that can lead to uneven application or over-application of the chemicals. It is also undesirable to allow high concentrations of potentially corrosive chemicals to seep into and remain in an irrigation system for long periods of time between uses.

SUMMARY OF THE INVENTION

It is therefore an object of the present invention to provide a lawn chemical application system that is easy and inexpensive to manufacture and install and that is easy to use.

It is a further object of the present invention to provide a system of the above type that provides for adequate mixing of water and chemicals while avoiding unnecessary obstruction to the flow of water.

It is a still further object of the present invention to provide a system of the above type that protects against undesirable seepage of chemicals into the system when the system is not in use.

It is a still further object of the present invention to provide a system of the above type that provides for even application of chemicals and that protects against over-application of chemicals.

It is a still further object of the present invention to provide a system of the above type that may be used to replace a master valve of an existing irrigation system or in place of a master valve in a new irrigation system.

Toward the fulfillment of these and other objects and advantages, the system of the present invention comprises a dispenser having a lower chamber, an upper chamber, an upstream opening, and a downstream opening. The dispenser may be formed by a tee connector and a cylinder secured to an upper opening of the tee connector. Powered valves are operably connected to the upstream and downstream openings of the dispenser. The powered valves may be wired to open and close simultaneously. A lower portion of the upper chamber may be disposed below an upper portion of the lower chamber and above a lower portion of the lower chamber, leaving the lower portion of the lower chamber unobstructed over substantially its entire length. The lower portion of the upper chamber may have a plurality of openings to provide for adequate mixing of water with the chemicals stored in the upper chamber. In operation, soluble matter or other chemicals are placed in the upper chamber of the dispenser, and the two valves are opened simultaneously. Water flows through the first powered valve and into the dispenser, where the water is mixed with soluble matter or other chemicals stored in the upper chamber of the dispenser. The solution or mixture then passes from the dispenser, through the second powered valve, and to one or more sprinkler heads of the irrigation system. When the application is finished, the valves are closed simultaneously.

BRIEF DESCRIPTION OF THE DRAWINGS

The above brief description, as well as further objects, features and advantages of the present invention will be more fully appreciated by reference to the following detailed description of the presently preferred but nonetheless illustrative embodiments in accordance with the present invention when taken in conjunction with the accompanying drawings, wherein:

FIG. 1 is an elevation view of a portion of a system of the present invention;

FIG. 2 is an enlarged, partially exploded view of a dispenser the present invention;

FIG. 3 is an enlarged, partially exploded view of an alternate embodiment of a dispenser of the present invention;

FIG. 4 is a partial, perspective view of a lower portion of an upper chamber for a dispenser of the present invention;

FIG. 5 is an enlarged, partially exploded view of an upper portion of an upper chamber for a dispenser of the present invention.

DETAILED DESCRIPTION OF THE PREFERRED EMBODIMENT

Figure 6:
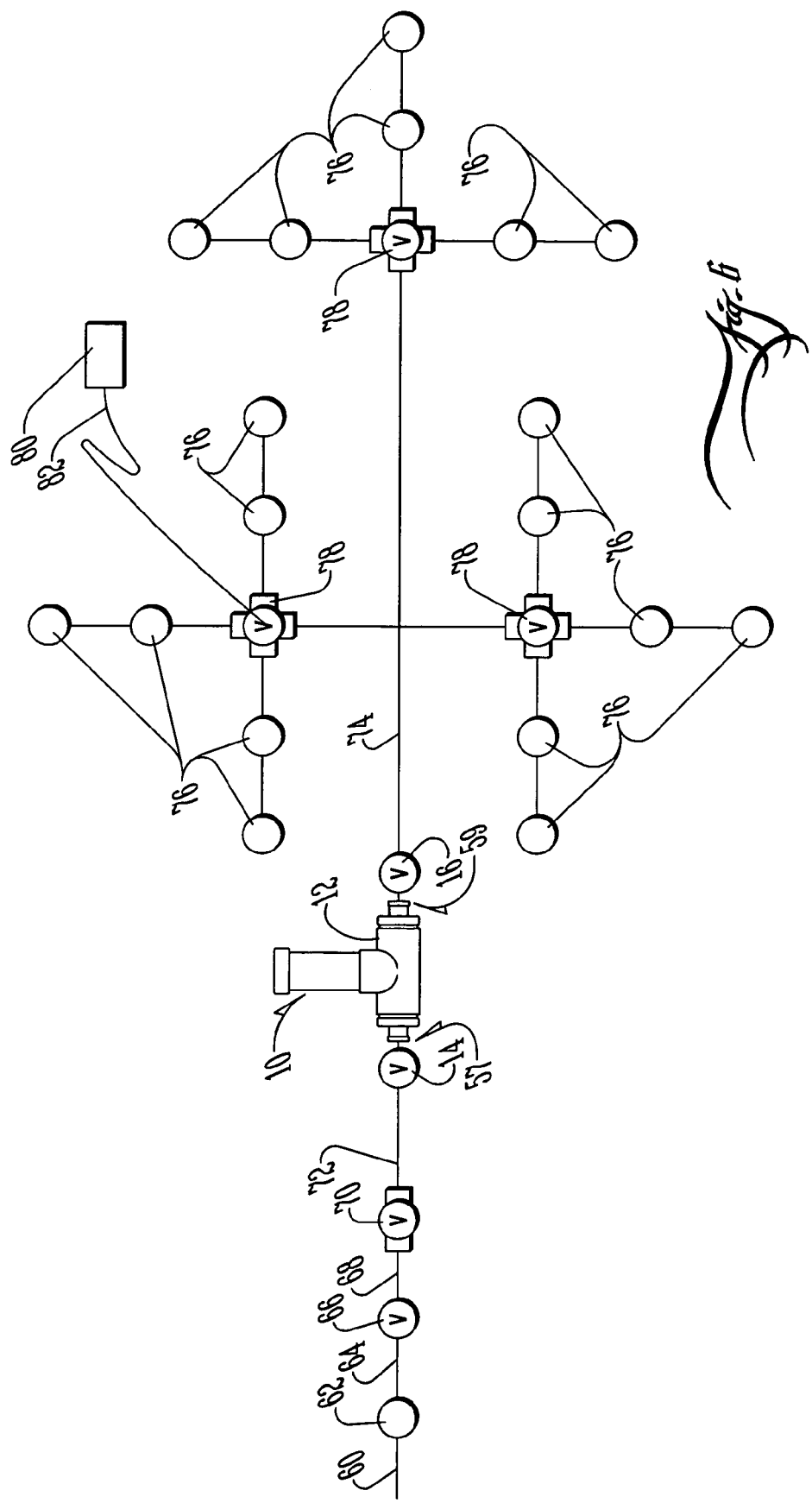
FIG. 6 is a schematic view of an irrigation system incorporating the lawn chemical application system of the present invention.

Referring to FIG. 1, the reference numeral 10 refers in general to a lawn chemical application system of the present invention. The system comprises a dispenser 12 and powered valves 14 and 16.

As best seen in FIG. 2, the dispenser 12 of the present invention may be formed by a connector such as a tee connector 18 and a cylinder 20 secured to an upper opening 22 of the tee connector 18. The connector 18 also has upstream and downstream openings 24 and 26 and forms a lower chamber 28. Shoulders 30 are formed around inside diameters of the connector 18 near the upstream, downstream, and upper openings 24, 26, and 22. The tee connector 18 is preferably made from Schedule 40 PVC rated to 200 psi, and is preferably a 4" or 6" tee connector 18. It is understood that the connector 18 may be made from a wide variety of materials, in a wide variety of strength, shapes and sizes.

The cylinder 20 has an upper portion 32 and a lower portion 34 having different outside diameters. The outside diameter of the upper portion 32 is greater than the outside diameter of the lower portion 34 so that a shoulder 36 is formed where the upper and lower portions meet. Shoulder 36 of the cylinder 20 mates with shoulder 30 of the upper opening 22 of the connector 18 to help secure the connector 18 and cylinder 20. Referring to FIG. 3, the top of the cylinder 20 is threaded. A threaded lid 38 having an O-ring 40 is provided to create a water tight seal at the top of the cylinder 20. A threaded opening 42 is provided through the lid 38. A bolt or screw 44 is fitted within the threaded opening 42. The bolt 44 has a channel 46 formed over a lower portion of at least one side, and an O-ring 48 is used to provide a water tight seal between the bolt 44 and lid 38. The bolt 44 may of course be made from any number of different materials but is preferably plastic or a similar material to reduce the chances of stripping the mating threads in the threaded opening 42.

As best seen in FIG. 4, the lower portion 34 of the cylinder 20 has a bottom 50. A plurality of openings 52 are provided in the bottom 50 of the cylinder 20 and in the side of the cylinder 20. The bottom 50 is preferably formed by a plurality of crisscrossing bars with openings 52 between the crisscrossing bars. Openings 52 are preferably also provided in a lower portion of the side to provide improved flow between the upper and lower chambers 28 and 54. The cylinder 20 forms an upper chamber 54. The cylinder 20 is preferably made from Schedule 40 PVC rated to 200 psi, and is preferably a 4" or 6" PVC pipe. It is understood that the cylinder 20 may be made from a wide variety of materials, in a wide variety of strength, shapes and sizes.

Referring to FIG. 2, the cylinder 20 is secured to the upper opening 22 of the connector 18 such as by gluing to form a watertight seal. The length of the lower portion 34 of the cylinder 20 is selected so that a lower portion of the upper chamber 54 is disposed below an upper portion of the lower chamber 28 and above a lower portion of the lower chamber 28. The lower portion of the lower chamber 28 is unobstructed over substantially its entire length. The bottom 50 of the cylinder 20 is preferably aligned at or near the vertical center of the lower chamber 28. The length of the upper portion 32 of the cylinder 20 is selected so that it extends approximately 15" above the center of the lower chamber 28. As best seen in FIG. 5, in an alternate embodiment, the dispenser 12 may be formed as a single piece.

Depending upon the size of the water lines of the irrigation system, the dispenser 12 may further comprise a variety of threaded and unthreaded reducing bushings 56 and nipples 58 that may be secured to the upstream and downstream openings 24 and 26 of the connector 18 to operably connect the powered valves 14 and 16 to the upstream and downstream openings 24 and 26 of the dispenser 12. In one preferred embodiment, a 4"×2" Schedule 40 PVC reducing bushing 56 is secured to the upstream opening 24 and to the downstream opening 26 of a 4" tee connector 18, such as by gluing. A 2"×1" Schedule 40 PVC threaded reducing bushing 56 is secured to each 4"×2" reducing bushing 56 such as by gluing. A 1" threaded nipple 58 is secured to each threaded reducing bushing 56. It is understood that the upstream and downstream openings 24 and 26 of the connector 18 may also serve as the upstream and downstream openings 57 and 59 of the dispenser if no bushings 56, nipples 58, or the like are used.

Each powered valve 14 or 16 is preferably an electric solenoid valve, such as a 1", 24 Volt, AC, 50/60 Hz, 2 Watts, Rainbird® brand valve rated to 150 psi. The powered valves 14 and 16 are secured to the threaded nipples 58 so that the powered valves 14 and 16 are operably connected to the dispenser 12. As the phrase "operably connected" is used herein, it is understood that the powered valve 14 or 16 need not be secured or affixed directly to the tee connector 18 or to a particular bushing 56 or nipple 58. A powered valve 14 or 16 is operably connected to the upstream or downstream opening 57 or 59 of the dispenser 12 as long as the powered valve 14 or 16 is within a few feet of the dispenser 12 and as long as no splits occur in the water line between the powered valve 14 or 16 and the dispenser 12. It is preferred that the powered valve 14 or 16 be secured directly to a nipple 58 or bushing 56 without any additional water line between the powered valve 14 or 16 and the dispenser 12. It is understood that the upstream and downstream openings 57 and 59 of the dispenser 12 may be sized as desired so that the powered valves 14 and 16 may be secured directly to the upstream and downstream openings 57 and 59 of the dispenser 12 without the need for bushings 56, nipples 58, and the like. The powered valves 14 and 16 may be secured in a variety of manners, but for ease of maintenance, repair, and replacement, it is preferred that the powered valves 14 and 16 not be glued to a nipple 58, bushing 56, or connector 18. For greater flexibility, it is preferred to provide a dispenser 12 having a connector 18 with oversized upstream and downstream openings 24 and 26 and to use reducing bushings 56 and the like so that a given dispenser 12 may be provided with a variety of sizes of upstream and downstream openings 57 and 59 so that it may be used in connection with a wide range of water line sizes.

As best seen in FIG. 6, the lawn chemical application system 10 of the present invention is integrated with or incorporated into an underground irrigation system. The lawn chemical application system 10 of the present invention is typically housed underground in a water meter box, with only the top of the water meter box visible at ground level. A water line 60, such as a city water line, provides a source of water for the irrigation system. The water line 60 typically connects to a water meter 62. Another line 64 passes from the water meter 62, through a gate valve 66, through line 68, and to an RPZ valve 70. The RPZ valve 70 prevents water from the irrigation system from flowing back into the water line 60 from the water source, for example preventing the flow of possibly doped water from the PVC pipes of a sprinkler system back into a city water supply. A short line 72 passes from the downstream side of the RPZ valve 70 to the upstream side of powered valve 14. The dispenser 12 is operably connected to the downstream side of valve 14, and valve 16 is operably connected to the downstream side of the dispenser 12. A water line 74 passes from the downstream side of valve 16. The water line 74 may be divided and passed to one or more sprinkler heads 76 in one or more watering zones using a variety of feed lines and valve boxes 78. The present system 10 may be used to replace a master valve of an existing irrigation system or in place of a master valve in a new irrigation system.

Typical water supply lines supply water at a wide range of pressures, such as from approximately 70 psi to approximately 110 psi. Although the system 10 is designed to withstand greater pressures, it is preferred to keep the water supply at or below approximately 120 psi. Pressure regulators may be used as needed, preferably upstream of the RPZ valve 70, to avoid pressures exceeding approximately 120 psi.

A controller 80 is operably connected to the various valves and valve boxes 78, preferably by wiring 82. The controller 80 is preferably positioned in a convenient place such as in or near a house or similar structure. Conductors 84 from valve 14 and valve 16 are in electrical contact with the controller 80 and with each other so that an electrical signal from the controller 80 will simultaneously open the valves 14 and 16 and so that an electrical signal from the controller 80 will simultaneously close the valves 14 and 16. It is understood that the powered valves 14 and 16 may be independently coupled to the controller 80 and may communicate with the controller 80 and with each other in a wide variety of ways including using wires and/or wireless communication. It is further understood that the powered valves 14 and 16 need not be linked to any central controller 80 at all as long as the powered valves 14 and 16 may be opened and closed when desired. It is also understood that the valves need not be opened or closed simultaneously.

The size of the dispenser 12 is selected based upon the size of the area to be serviced by the irrigation system. For example, a dispenser 12 having a 4" cylinder 20 will hold approximately 5 lbs. of soluble matter or other chemicals, which should be sufficient for most residential uses. A dispenser 12 with a 6" cylinder 20 will hold approximately 15 lbs. of soluble matter or other chemicals, which should be sufficient for most commercial uses. It is understood that larger or smaller dispensers may be used as desired.

In operation, a user selects a lawn chemical 86 to be applied to the area to be serviced. The system 10 may be used to apply a wide variety of lawn chemicals, including but not limited to soluble matter, and including but not limited to fertilizer, herbicides, pesticides, insecticides, fungicides, disinfectants, nutrients, and the like. The lawn chemical 86 may take any number of forms including but not limited to liquid, granular, tablets, pellets, and blocks. The user removes the lid 38 from the cylinder 20, after using the pressure release means 42–48 if necessary, and places the lawn chemical 86 in the upper chamber 54 formed by the cylinder 20. The lawn chemical 86 may be placed directly into the upper chamber 54, or a container 88 such as a bag or canister containing the lawn chemical 86 may be placed into the upper chamber 54. For ease of packaging, storage, transportation, and use, in one preferred embodiment, the lawn chemical is in a container 88 such as a bag that is housed inside a perforated canister. The user then replaces the lid 38.

The user actuates the system, such as using a controller 80. The controller 80 simultaneously opens powered valves 14 and 16 allowing water to flow from line 60, through the water meter 62, line 64, gate valve 66, line 68, and RPZ valve 70. From the RPZ valve 70 the water passes through line 72, through powered valve 14, and into the dispenser 12. In the dispenser 12, a portion of the water passes through the openings 52 in the bottom 50 and sides of the upper chamber 54 and passes into the upper chamber 54 where the water dissolves or is otherwise doped with the lawn chemical 86 stored in the upper chamber 54. A solution or mixture of the water and lawn chemical 86 then passes from the upper chamber 54 to the lower chamber 28 before passing from the downstream side of the dispenser 12, through powered valve 16, and through line 74. The water and lawn chemical 86 contained therein then pass to one or more sprinkler heads 76 for application to a lawn or other area to be treated. After a desired amount of water or lawn chemical 86 is applied, or after a desired amount of time has passed, the user or controller 80 simultaneously closes powered valves 14 and 16. The closed upstream powered valve 14 discontinues the flow of water into the dispenser 12 from the line 60, water meter 62, line 64, gate valve 66, line 68, RPZ valve 70, and line 72. The downstream powered valve 16 helps seal water and unused lawn chemicals 86 within the dispenser 12. It is of course understood that the system 10 may be used with or without the powered valves 14 and 16 or with only one of the powered valves 14 and 16 being used.

Other modifications, changes and substitutions are intended in the foregoing, and in some instances, some features of the invention will be employed without a corresponding use of other features. For example, only one powered valve 14 or 16 may be used, and the powered valve 14 or 16 may be disposed upstream or downstream of the dispenser 12. The dispenser 12 may take any number of sizes, shapes, and configurations, and may be formed as a single piece or may be assembled from a number of components. Also, the system 10 is described as being used in connection with an underground irrigation system, it is understood that the system 10 may be used in combination with any number of forms of watering, including but not limited to use in combination with a garden hose, soaker hose, or the like. Further, the system 10 may be used in connection with the doping and distribution of not only water but also a wide variety of fluids. Accordingly, it is appropriate that the appended claims be construed broadly and in a manner consistent with the scope of the invention.

What is claimed is:

1. An irrigation system, comprising:
   a first water line;
   an RPZ valve, said first water line being operably connected to an upstream side of said RPZ valve;
   a second water line operably connected to a downstream side of said RPZ valve;
   a first powered valve, said second water line being operably connected to an upstream side of said first powered valve;
   a dispenser operably connected to a downstream side of said first powered valve;
   a second powered valve, operably connected to a downstream side of said dispenser;
   a third water line operably connected to a downstream side of said second powered valve; and
   a sprinkler head operably connected to said third water line.

2. The system of claim 1, wherein said dispenser comprises an upper chamber and a lower chamber, a lower portion of said upper chamber being disposed below an upper portion of said lower chamber.

3. The system of claim 2 wherein said lower portion of said upper chamber is disposed above a lower portion of said lower chamber, and said lower portion of said lower chamber is unobstructed over substantially its entire length.

4. The system of claim 2, wherein the upper chamber is formed from a first component and the lower chamber is formed from a second component, the first and second components separate from one another.

5. The system of claim 4, wherein the first component comprises a first shoulder and the second component comprises a second shoulder, the first and second shoulders mating with one another upon insertion of the first component into the second component.

6. The system of claim 5, wherein the first and second components are sealed to one another proximate to the shoulders by one or more sealing members.

7. The system of claim 2, wherein the dispenser comprises one or more criss-crossing bars with openings between the bars to provide flow between the upper and lower chambers.

8. The system of claim 1, wherein the first and second powered valves are solenoid valves.

9. The system of claim 1, wherein the first and second powered valves are manipulatable using an electrical controller electrically connected to the first and second powered valves.

10. A method of irrigating an area, comprising:
   (1) providing a dispenser, a first powered valve operably connected to an upstream side of said dispenser, and a second powered valve operably connected to a downstream side of said dispenser;
   (2) opening said first and second powered valves;
   (3) passing water through an RPZ valve;
   (4) after step (3), passing said water through said first powered valve and into said dispenser;
   (5) after step (4), adding soluble matter to said water;
   (6) after step (5), passing said water from said dispenser and through said second powered valve;
   (7) after step (6), passing said water to a sprinkler head; and
   (8) after step (7), closing said first and second powered valves.

11. The method of claim 6 wherein step (5) comprises:
   (a) passing a portion of said water from a lower chamber of said dispenser into an upper chamber of said dispenser to dissolve soluble matter stored within said upper chamber; and
   (b) after step (a), passing, a solution of water and soluble matter from said upper chamber to said lower chamber.

12. The system of claim 10 wherein the opening and closing of the first and second powered valves are accomplished using an electrical controller electrically connected to the first and second powered valves.

13. The system of claim 10, wherein opening said first and second powered valves comprises sending an electrical signal to the first and second powered valves using a controller.

14. The system of claim 13, wherein the electrical signal is simultaneously sent to the first and second powered valves using the controller.

15. The system of claim 13, wherein the electrical signal comprises wireless communication between the first and second powered valves and the controller.

16. An irrigation system, comprising:
   a first water line;
   an RPZ valve, said first water line being operably connected to an upstream side of said RPZ valve;
   a second water line operably connected to a downstream side of said RPZ valve;
   a first powered valve, said second water line being operably connected to an upstream side of said first powered valve;
   a dispenser operably connected to a downstream side of said first powered valve, wherein said dispenser comprises an upper chamber and a lower chamber, a lower portion of said upper chamber being disposed below an upper portion of said lower chamber, wherein said upper chamber comprises a cylinder, said cylinder having an upper portion with a first diameter, and a lower portion with a second diameter, said second diameter being less than said first diameter;
   a second powered valve operably connected to a downstream side of said dispenser;
   a third water line operably connected to a downstream side of said second powered valve; and
   a sprinkler head operably connected to said third water line.

17. The system of claim 8, further comprising:
   a lid removably secured to an upper portion of said cylinder; and
   pressure release means operably connected to said lid for releasing pressure from within said cylinder before said lid is removed.

\* \* \* \* \*